Figure 1:
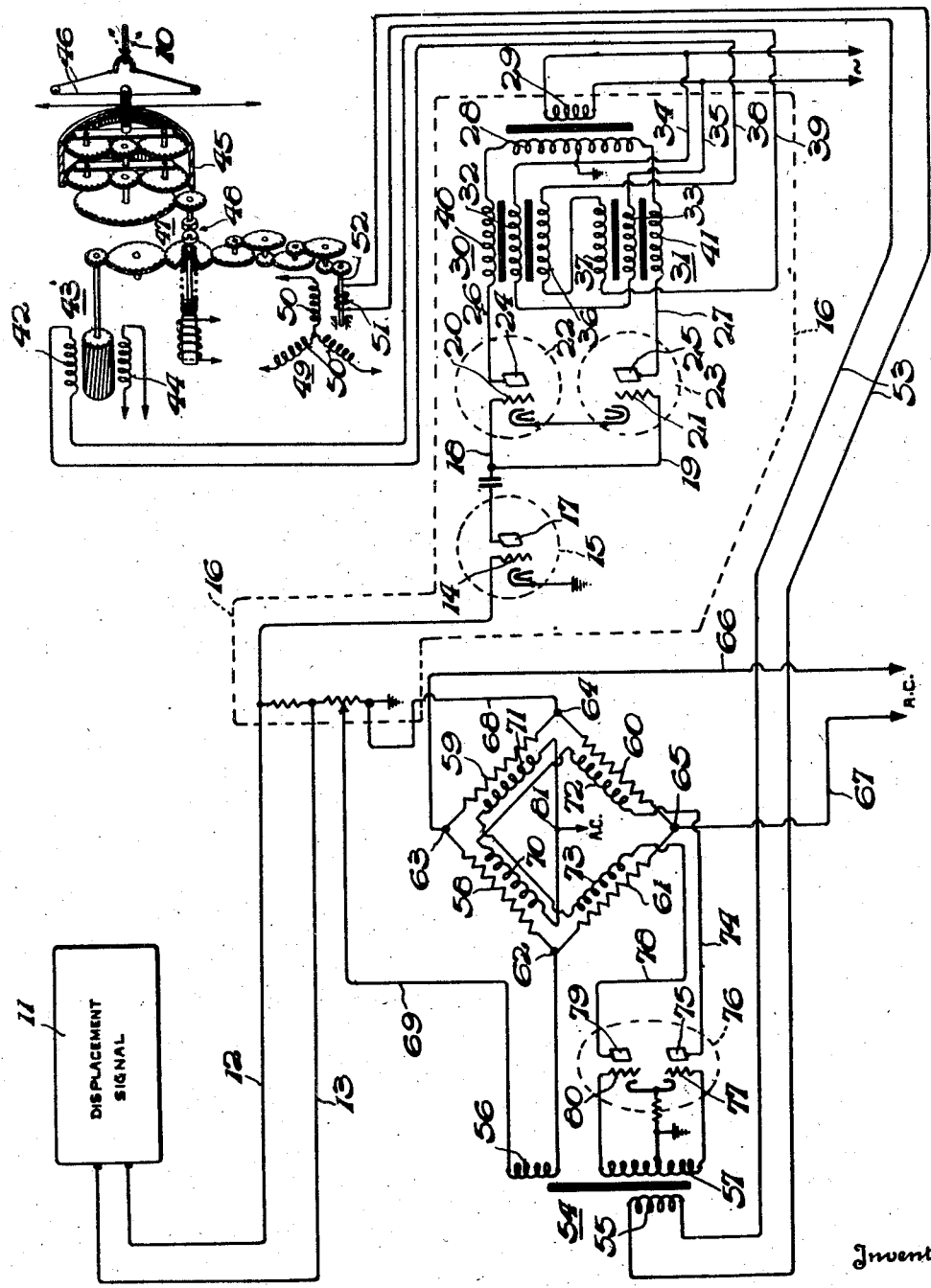

Dec. 2, 1947.　　　　P. A. NOXON　　　　2,432,036
AUTOMATIC CONTROL SYSTEM
Filed Nov. 10, 1944　　　2 Sheets-Sheet 2

Inventor
Paul A. Noxon
By
Attorney

Patented Dec. 2, 1947

2,432,036

UNITED STATES PATENT OFFICE 2,432,036

AUTOMATIC CONTROL SYSTEM

Paul A. Noxon, Tenafly, N. J., assignor to Bendix Aviation Corporation, Teterboro, N. J., a corporation of Delaware Application November 10, 1944, Serial No. 562,823

17 Claims. (Cl. 172—282)

1

This invention relates generally to automatic steering systems for mobile craft such as automatic pilots for aircraft, for example, and more particularly to novel means for such systems with the use of which either automatic trim functions may be obtained and/or craft hunting about any or all of its control axes may be overcome.

In the known arrangement for the automatic control of aircraft by means of automatic steering systems which provide average displacement of a control surface proportional to the deviation of the craft from datum there are two undesirable effects which are inevitably encountered. First of all, such systems can only compensate for a constant disturbing moment or a disturbance of datum due to hysteresis in the control system or the structure of the craft itself by changing the average attitude of the craft sufficient to provide the required new average displacement of the control surface. Secondly, where displacement control systems are utilized, due to craft inertia, hunting may occur about axes where the inherent damping is insufficient.

Methods heretofore employed in control systems of this general character for automatically overcoming changes in load moment, i. e., automatic trim, have generally consisted of some form of mechanical integration comprising, for example, a small motor energized by the average signal to develop a corrective signal, or operating from a primary reference through the medium of a high ratio gearing to provide the necessary time lag, or, further, a small motor operating trim tabs on the control surfaces of the craft through high ratio gearing. Such systems are mechanically complicated and require considerable maintenance. In the case of the trim tab method, failure may cause the trim tab to reach an extreme position which will cause a large craft to become uncontrollable manually.

The use of rate components, on the other hand, added algebraically to displacement terms for the purpose of stable control and dampening is well known in the art. To this end, rate terms have been generated by devices such as, a constrained gyroscope whose deflection against a centralizing spring is proportional to rate of craft turn about the axis being controlled, pneumatic devices sensitive to rate of change of pressure in a pneumatic signal system and transformer and condenser resistance networks in electrical systems. In practice, the foregoing devices have proved cumbersome in that the gyroscope is expensive to manufacture and requires considerable maintenance while the transformer and condenser

2 resistance systems have required demodulation and remodulation where employed in A. C. current signal systems.

The present invention contemplates the provision of a novel arrangement in the nature of a thermal time delay mechanism adapted, when applied to bank or pitch channel follow-up signals, to operate as an automatic trim provision for an automatic pilot so that subsequent to a load change on the craft it will be returned substantially to datum and maintained thereon. Furthermore, when applied to a displacement signal of an automatic pilot system, whether it be direction, pitch or bank, it will act as an antihunting or dampening provision for any or all of the control axes of the craft.

An object of the present invention, therefore, is to provide a novel automatic control system for mobile craft which will accurately and reliably maintain the craft substantially on a prescribed course and/or in a predetermined altitude.

Another object of the invention is to provide a novel automatic steering system for mobile craft adapted for suppressing hunting thereof about any or all of its axes of control whereby dead beat operation of the craft is obtained and/or adapted for returning and maintaining a craft substantially in datum after a change in attitude due to a change in load moment.

A further object is to provide a novel antihunting provision in the nature of an error averaging mechanism for an automatic steering system for mobile craft whereby the craft will be provided with proper dampening about any or all of its control axes.

Another object is to provide a novel and relatively simple automatic trim arrangement for automatic control systems for mobile craft.

The above and further objects and novel features of the invention will more fully appear from the following detailed description when the same is read in connection with the accompanying drawings. It is to be expressly understood, however, that the drawings are for purposes of illustration only and are not intended as a definition of the limits of the invention.

Figure 2:
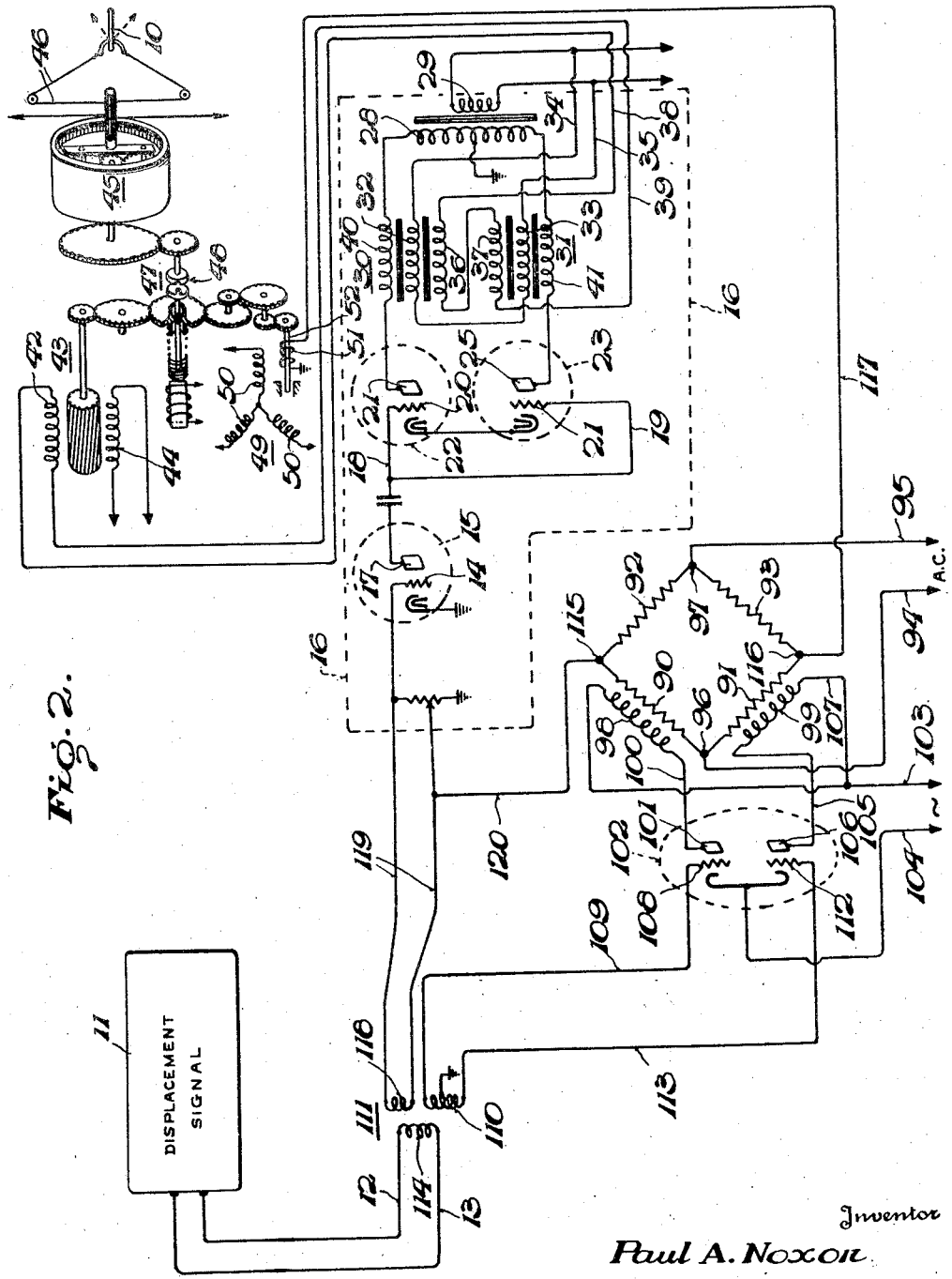

In the drawings wherein like reference characters refer to like parts, throughout the several views, Figure 1 is a diagrammatic illustration of an automatic steering system for one control axis of a mobile craft incorporating the novel subject matter of the present invention in the follow-up channel thereof; and, Figure 2 is a view similar to that of Figure 1 having, however, the novel provision of the present invention applied to the direction displacement channel thereof.

Referring now to the drawings for a more detailed description and particularly to Figure 1 thereof, the present invention is shown as applied to an aircraft automatic pilot of the general character shown and described in copending application Serial No. 516,488 filed December 31, 1943. The displacement signal for controlling the position of a control surface 10 is derived from a signal generating device, generally designated with the reference character 11, which device may comprise the gyro stabilized magnetic pick-up device of the aforementioned application where the present invention is applied to automatic rudder trim or which may comprise the electrical pitch or bank take-off of the aforementioned application where the invention is applied to automatic elevator or aileron trim.

As more fully described in the aforementioned application, the signal is fed by generator 11 through leads 12 and 13 to the grid 14 of a tube 15 of a servo amplifier 16. Plate 17 of tube 15 connects through parallel conductors 18 and 19 with grids 20 and 21 of tubes 22 and 23, the plates 24 and 25 of the latter tubes being connected by way of conductors 26 and 27 with a split secondary winding 28 of a transformer whose primary winding 29 connects with a suitable source of alternating current (not shown) such as the craft's power supply.

Magnetic reactors 30 and 31 are provided between each plate 24 and 25 and its related connection with secondary winding 28. Each of the reactors comprises a soft iron core (not shown) having primary windings 32 and 33 connected in series with each other and with the current source through conductors 34 and 35 which may be tapped to the leads feeding primary 29. Furthermore, each reactor is provided with a secondary winding 36 and 37 which are connected in series opposed relation and have output leads 38 and 39. In addition to the primary and secondary windings, each reactor is provided with a saturating winding 40 and 41 connected with leads 26 and 27.

Output leads 38 and 39 of the series opposed secondaries connect with one phase winding 42 of a two phase motor 43, whose second or fixed phase winding 44 is connected with the craft's source of power. Motor 43 is adapted for driving a servomotor 45, connected through cables 46 with control surface 10, through a gear reduction system 47 and a normally engaged solenoid operated clutch 48.

With the craft in a predetermined attitude, with no apparent deviation about its pitch axis, for example, the signals at grids 20 and 21 from generator 11 are at zero so that the network is balanced and the current at output leads 38 and 39 of the reactors is zero because secondaries 36 and 37 are in series opposed relation so that induced currents in one secondary balance the induced currents in the other secondary. Upon the occurrence of a deviation from a predetermined attitude a signal will be developed by generator 11 which may be considered to be passing from zero to a positive maximum value at grids 20 and 21 of tubes 22 and 23. Assuming that, at that moment, the current at plate 24 of tube 22 is passing from zero to a positive maximum value, the current at plate 25 of tube 23 will be passing from zero to a negative maximum value so that no current will flow in saturating winding 41. Current, however, of a pulsating character will flow at lead 26 and, therefore, within saturating winding 40 as a result of which the core of reactor 30 will become saturated so that currents induced in secondary 36 will be decreased causing network unbalance and creating current flow in one direction within leads 38 and 39 to energize motor 43.

If craft deviation is in a direction opposite to that above considered, the signal from generator 11 impressed on grids 20 and 21 will be of such a character that it will pass from a zero to a negative maximum value so that no current will flow at plate 24 but will flow at plate 25 and within lead 27. In such event, the core of reactor 31 will become saturated thereby decreasing the currents induced within secondary 27 and the network will again become unbalanced whereby currents will flow at leads 38 and 39 in an opposite direction to reverse the operation of motor 43.

In order to prevent overcontrol of surface 10 and also to impart stability to the craft to prevent oscillation thereof, an electrical follow-up system is provided in the nature of an inductive device 49 comprising a wound stator 50 energized from the craft source of supply and an inductively coupled wound rotor 51 which is mounted by a shaft 52 for angular motion by motor 43, the driving connection between the motor and the rotor being a permanent one and independent of whether or not clutch 48 is engaged or disengaged. Normally, rotor 51 is maintained in a null position, i. e., one in which the electrical axis of the rotor winding is normal to the resultant magnetic field at the stator. Motion from the null position on the part of rotor 51, during operation of motor 43, causes the inducement of a signal within the rotor winding which is led off and impressed upon grid 14 of tube 15 by way of conductors 53 and a transformer 54, having a primary 55 and a split secondary 56 and 57 the purpose of which will presently appear. The signal generated within rotor 51 is in opposition to the displacement signal within generator 11 and increases with increased motion of surface 10 until a given point is reached, at which time the signal of rotor 51 is exactly equal and opposite to the displacement signal to thereby "wash out" the displacement signal at which time motor 43 is de-energized and control surface 10 has attained a deflected position proportional to the displacement signal.

With the surface 10 in its applied position and motor 43 de-energized, the craft begins to return to its prescribed reference. In doing so, the displacement signal developed by generator 11 starts to diminish in value while the follow-up signal of rotor winding 51, being at a maximum, becomes predominating and energizes motor 43 in a reverse direction to start bringing surface 10 back to a neutral position, motor reversal being determined by current flow in an opposite one of saturating winding 40 or 41 to the one having current flow therein upon initial craft departure from datum as explained above. With reverse motor operation, the signal in rotor 51 diminishes until the rotor attains its null wherein, unless another displacement signal originates at generator 11, the control surface and generator will be in synchronism. For further stability and prevention of over control, a rate of displacement signal may be utilized in addition to the displacement signal for controlling surface 10 in the manner fully described in the aforementioned copending application.

Although the automatic pilot thus far described constitutes a desirable system for the control of mobile craft such as aircraft, for example, under control will result in the event of a load change so that the craft will not be returned to datum but to some attitude parallel to datum. This means that the original trim adjustment which maintained the craft in datum is no longer satisfactory for the new condition due to load change. By means of the present invention a novel arrangement is provided which provides the necessary additional signal for automatically supplementing the original trim adjustment to return the craft substantially to datum.

As shown in Figure 1 such novel arrangement comprises a thermal time delay circuit or averaging mechanism in the follow-up channel having a bridge circuit formed by four resistors 58, 59, 60 and 61 composed of high temperature coefficient of resistance materials, resistor 58 being connected between taps 62 and 63 of the bridge, resistor 59 being connected between taps 63 and 64, resistor 60 being connected between taps 64 and 65, and resistor 61 being connected between taps 62 and 65, a suitable source of A. C. energizing current being provided between taps 63 and 65 by means of conductors 66 and 67. Taps 62 and 64, on the other hand, connect by way of conductors 68 and 69 with secondary 56 of transformer 54 and the grid 14 of tube 15.

Arranged in heat exchange relation with resistors 58, 59, 60 and 61 are heater coils 70, 71, 72 and 73, coils 70 and 72 of which, arranged adjacent opposite resistors 58 and 60, connect through conductor 74 with plate 75 of a dual triode 76, the related grid 77 of which connects with one end of secondary 57, while coils 71 and 73, arranged adjacent resistors 59 and 61, connect through a conductor 78 with plate 79 of tube 76, the related grid 80 of which connects with the other end of secondary 57. The free ends of coil heaters 70 and 71 connect through a common tap 81 with an A. C. source (not shown) constituting the plate supply for tube 76. It will now be apparent that differential heating across opposite arms of the bridge, i. e., resistors 58, 60 or resistors 59, 61, caused by current flow through corresponding heater coils 70, 72, or 71, 73, produces an unbalance of the bridge allowing a portion of the voltage from the source connected across taps 63 and 65 to appear across conductors 68 and 69. Although shown as comprising four resistors in the bridge circuit and four heater coils, the arrangement may comprise two variable resistors and two fixed resistors with only two heater coils as shown and described more fully in copending application Serial No. 562,826 filed November 10, 1944.

The circuit comprising secondary 57 of the transformer, the dual triode 76, the heater coils and bridge assembly is designed to produce a voltage equal and opposite to that appearing across secondary 56 after sufficient time has elapsed for the temperature differential in the bridge arms to become stabilized. Within the range of operation, therefore, no average value of voltage of appreciable magnitude can exist across conductors 68 and 69. Since, however, the bridge is designed to have a long time constant (in the order of a half a minute) it will have no appreciable effect on frequencies encountered in normal operation (from ¼ to 1¼ cycles per second) therefore will not interfere with the normal dynamics of the system except to a very negligible degree since for such conditions secondary 56 will merely repeat the follow-up voltage from rotor 51 which will be added to a practically fixed value from the bridge.

It may be assumed that the above arrangement is applied to the pitch circuit of the automatic pilot so that any signal originating in generator 11 will be proportional to craft departure from a given attitude. It may be further assumed that a change in load moment has occurred so that the craft moves from datum giving rise to a displacement signal in generator 11. Such signal is impressed upon grid 14 of tube 15 to energize servomotor 43, as heretofore described, whereby the elevator or surface 10 is displaced enough to apply a control moment equal to the change in load moment. Further motion of surface 10 is arrested by the follow-up signal developed at rotor 51 which is nearly equal to the displacement signal produced by the change in attitude, the difference between the displacement signal and the follow-up voltage being that required to furnish the load torque to the servomotor. In order to overcome the load moment, the control surface and, therefore, the servomotor are required to occupy a new position. Since the change in servo position produces a follow-up voltage, a constant displacement signal of comparable magnitude must be maintained, and that can be maintained only by a change in the attitude of the craft. Thus, after a pitch condition, the craft will be levelled in attitude but cannot return to datum.

The novel subject matter of the present invention constitutes in effect an automatic trim provision adapted for restoring the craft attitude substantially to datum. To this end, it may be assumed that the follow-up signal developed at rotor 51, due to displacement in attitude, is in such a direction that grid 80 of tube 76 is at the positive side of its cycle and that at the same time its plate 79 is at the positive side of the cycle from its supply source. Heater coils 71 and 73, therefore, have current flowing through them and produce heat which is transferred to resistors 59 and 61, respectively associated with them. At the same instant, when plate 75 is positive, grid 77 will be at the most negative part of its cycle consequently less current or no current will flow through heater coils 70 and 72 allowing them to cool off and corresponding resistors 58 and 60 will be reduced in temperature. As the temperatures gradually change, a voltage opposite to that being furnished by secondary 56 will gradually appear in series with it causing a gradual reduction in voltage across conductors 68 and 69. As a result, more of the displacement signal from generator 11 will be available across grid 14 of tube 15. The servo motor 43 will then be actuated in such a direction as to reduce the displacement signal so that the follow-up signal and the displacement signal again cancel. This operation will continue until either the displacement signal has been reduced to zero or the servo motor can no longer move. When this has been achieved, the net voltage on grid 14 of tube 15 will be just sufficient to carry the load torque. Once this condition has been reached, no further change can take place since the final voltage across the bridge arms must equal the original follow-up signal which was originally equal to the displacement signal minus the small amount required to carry load torque. Residual displacement signal will therefore be left whose function will be to carry such load torque. Inasmuch as this can be obtained with a fraction of a degree of displacement, the above system will be substantially compensated for change in load moment. In effect, therefore, a system of integration is provided without the requirement of motors and other mechanical equipment heretofore utilized.

It is desirable in practice to arrange the trim circuit so that the final bridge voltage will never be greater but always equal to or slightly less than the voltage across secondary 56 for the reason that if this voltage is greater than that across secondary 56, it would tend to overcorrect and induce hunting of a very long period.

While the system has been illustrated and described hereinabove in connection with the follow-up signal channel to provide automatic trim control, it may be applied equally as well directly to the displacement signal channel where it will act in the nature of a differentiation mechanism to impress upon the displacement signal a corrective signal which will apply a dampening factor to prevent craft hunting, such application being adapted for application to any or all of the three axes of craft control. To this end the arrangement of Figure 2 is provided which comprises substantially the automatic control of Figure 1 in that normally a displacement signal originating in generator 11 is impressed upon grid 14 of tube 15 and ultimately energizes servomotor 43 to operate control surface 10. In response to servomotor operation, a follow-up signal is developed at rotor 51 to be impressed upon the displacement signal substantially in the manner described in connection with Figure 1.

In this case the bridge circuit is shown as comprising two variable resistors 90 and 91 formed of high temperature coefficient of resistance material and two fixed resistors 92 and 93, a suitable source of A. C. current being connected by way of conductors 94 and 95 with taps 96 and 97. Arranged in heat exchange relation with resistors 90 and 91 are two heater coils 98 and 99, one of which connects at one side by way of a lead 100 with a plate 101 of a dual triode tube 102 and at its opposite side by way of conductor 103 with one side of plate supply (not shown), the other side of the supply connecting by way of lead 104 with the tube filaments, and the other of which connects at one of its sides by way of a lead 105 with a plate 106 of the tube and at its opposite side by way of conductor 107 with the plate supply through conductor 103.

The corresponding grid 108 of plate 101 connects by way of a lead 109 with one side of a split secondary 110 of a transformer 111 while grid 112 of plate 105 connects by way of lead 113 with the opposite side of the secondary. The primary 114 of the transformer is connected across leads 12 and 13 and has a secondary 118 which connects by way of leads 119 with grid 14 of tube 15. One of the conductors 119 connects with bridge tap 115 by means of a lead 120 while the opposite bridge tap 116 connects with rotor 51 through a conductor 117.

Assuming displacement in azimuth, generator 11 develops a signal proportional to such displacement to energize servo motor 43 and operate the control surface. A follow-up signal is developed at rotor 51 as a result of servo operation and such signal is fed by way of conductor 117 through the bridge and conductor 120 to be impressed upon the displacement signal on grid 14 of tube 15, such displacement signal passing through secondary 118 to the tube. Assuming, further, a series of course departures due to air disturbances, the displacement signal will, in addition to being impressed upon grid 14, be impressed through secondary 110 on either grid 108 or 112 as heretofore explained so that current flows in either coil 98 or 99 to heat resistor 90 or 91 and thereby unbalance the bridge so that current will flow from the source feeding conductors 94 and 95 to grid 14. The bridge circuit, heater coils 98 and 99, and the dual triode act in the nature of an error averaging device whereby after a certain interval of time has elapsed an additional displacement or corrective signal is fed to grid 14 to thereby bring and thereafter maintain a craft on a substantially predetermined course.

The circuit, moreover, constitutes a rate generating circuit and by being arranged in the manner of Figure 2 will develop a rate signal from the displacement signal so that both a displacement and rate signal will be available for servo control without resorting to a separate rate of turn gyro instrument and take-off as disclosed in the aforementioned application. It will be apparent that in contrast to rate generating systems now known using R/C circuits, the present method is inherently low impedance. For this reason it will now be subject to failure and change of characteristic due to humid atmosphere to any appreciable degree. Further, in dealing with A. C. signals, it does not require demodulation, filtering and remodulation as is required with R/C methods.

There has thus been provided an automatic steering or control system for mobile craft having novel and relatively simple automatic trim provision and/or dampening means for preventing craft hunting about any or all of its axes of control.

Although but two embodiments of the invention have been illustrated and described, various changes and modifications in the form and relative arrangement of the parts, which will now appear to those skilled in the art, may be made without departing from the scope of the invention. Reference is therefore to be had to the appended claims for a definition of the limits of the invention.

I claim:

1. In combination with a normally balanced electrical circuit having resistor means therein, heat generating means arranged in heat exchange relation with said resistor means, and a source of current for energizing said heat generating means whereby the value of said resistor means is varied to thereby unbalance said first-named circuit.

2. In combination with a controlled circuit comprising a normally balanced electrical circuit having a conductive element therein possessing a high temperature coefficient of resistance, heat generating means arranged in heat exchange relation with said conductive element, and a source of current for energizing said heat generating means whereby the value of the resistance of said conductive element is varied to thereby unbalance said controlled circuit.

3. In an automatic control device for a craft having a control surface movable with respect thereto for controlling said craft about an axis thereof, a servomotor for operating said surface, reference means on said craft for generating a signal in response to a departure of said craft from a predetermined position to energize said motor, means for producing a follow-up signal upon relative displacement of said surface with respect to said craft for modifying said first signal, and a time delay device energized by one of said signals for modifying operation of said servomotor.

4. In an automatic control device for a craft having a control surface movable with respect thereto for controlling said craft about an axis thereof, a servomotor for operating said surface, reference means on said craft for generating a signal in response to a departure of said craft from a predetermined position to energize said motor, means for producing a follow-up signal upon relative displacement of said surface with respect to said craft for modifying said first signal, and time delay means comprising a normally balanced circuit adapted for energization by one of said signals to provide a third signal for modifying operation of said servomotor.

5. In an automatic pilot for a craft having a control surface movable with respect thereto for controlling said craft about an axis thereof, a servomotor for operating said surface, reference means on said craft for generating an electric signal in response to a departure of said craft from a predetermined position to energize said motor, means for producing an electric follow-up signal upon relative displacement of said surface with respect to said craft for modifying said first signal, and time delay means comprising a normally balanced bridge circuit adapted for unbalancing by one of said signals for deriving a third signal for modifying operation of said servomotor.

6. In an automatic pilot for a craft having a control surface movable with respect thereto for controlling said craft about an axis thereof, a servomotor for operating said surface, reference means on said craft for generating a signal in response to a departure of said craft from a predetermined position to energize said motor, means for producing a follow-up signal upon relative displacement of said surface with respect to said craft for modifying said first signal, and a time delay device energized by said follow-up signal for developing a third signal to modify operation of said servomotor.

7. In an automatic pilot for a craft having a control surface movable with respect thereto for controlling said craft about an axis thereof, a servomotor for operating said surface, reference means on said craft for generating a signal in response to a departure of said craft from a predetermined position to energize said motor, means for producing a follow-up signal upon relative displacement of said surface with respect to said craft for modifying said first signal, and a time delay device energized by said first signal for developing a third signal to modify operation of said servomotor.

8. In an automatic control device for a craft having a controlled surface movable with respect thereto for controlling said craft about an axis thereof, a servomotor for operating said surface, reference means on said craft for generating a signal in response to a departure of said craft from a predetermined position to energize said motor, means for producing a follow-up signal upon relative displacement of said surface with respect to said craft for modifying said first signal, means for modifying the operation of said servomotor comprising a normally balanced circuit having resistor means therein and a controlling circuit therefor comprising heat generating means in heat exchange relation with said resistor means, and means responsive to one of said signals for energizing said heat generating means whereby the value of said resistor means is varied to unbalance said normally balanced circuit and provide a third signal for said servomotor.

9. In an automatic control device for a craft having a controlled surface movable with respect thereto for controlling said craft about one axis thereof, a servomotor for operating said surface, reference means on said craft for generating a signal in response to a departure of said craft from a predetermined position to energize said motor, means for producing a follow-up signal upon relative displacement of said surface with respect to said craft for modifying said first signal, anti-hunting means for modifying the operation of said servomotor comprising a normally balanced bridge circuit having resistor means therein and a controlling circuit therefor comprising heat generating means in heat exchange relation with said resistor means, and means energized by said first signal for energizing said heat generating means whereby the value of said resistor means is varied to unbalance said bridge circuit and provide a third signal for said servomotor.

10. In an automatic control device for a craft having a controlled surface movable with respect thereto for controlling said craft about one axis thereof, a servomotor for operating said surface, reference means on said craft for generating a signal in response to a departure of said craft from a predetermined position to energize said motor, means for producing a follow-up signal upon relative displacement of said surface with respect to said craft for modifying said first signal, anti-hunting means for modifying the operation of said servomotor comprising a normally balanced bridge circuit having resistor means therein and a controlling circuit therefor comprising heat generating means in heat exchange relation with said resistor means, and means energized by said follow-up signal for energizing said heat generating means whereby the value of said resistor means is varied to unbalance said bridge circuit and provide a third signal for said servomotor.

11. In an automatic control device for a craft having a controlled surface movable with respect thereto for controlling said craft about one axis thereof, a servomotor for operating said surface, reference means on said craft for generating an electric signal in response to a departure of said craft from a predetermined position to energize said motor, means for producing an electric follow-up signal upon relative displacement of said surface with respect to said craft for modifying said first signal, anti-hunting means for modifying the operation of said servomotor comprising a normally balanced bridge circuit having a conductive element therein possessing a high temperature coefficient of resistance and a controlling circuit therefor comprising heat generating means in heat exchange relation with said conductive element, and means energized by one of said signals for energizing said heat generating means whereby the resistance of said conductive element is varied to unbalance said bridge circuit and provide a third electric signal for said servomotor.

12. In an automatic control device for a craft having a controlled surface movable with respect thereto for controlling said craft about one axis thereof, a servomotor for operating said surface, reference means on said craft for generating a signal in response to a departure of said craft from a predetermined position, amplifier means for amplifying said signal to energize said servomotor, means for producing a follow-up signal upon relative displacement of said surface with respect to said craft for modifying said first signal, anti-hunting means for modifying the operation of said servomotor comprising a normally balanced circuit having resistor means therein connected to said amplifier means and a controlling circuit therefor comprising heat generating means in heat exchange relation with said resistor means, and means energized by one of said signals for operating said heat generating means whereby the value of said resistor means is varied to unbalance said normally balanced circuit whereupon a third signal is provided at said amplifier means.

13. In combination with an automatic control system for aircraft having a controlled surface and a servomotor therefor responsive to control displacement and follow-up signals, an anti-hunting mechanism for said craft comprising a controlled circuit for developing a dampening signal on the servomotor, a controlling circuit responsive to one of said control signals, and means operated by said controlling circuit for energizing after a predetermined time lag said controlled circuit.

14. In combination, signal generating means, controlled means connected to and energized by said signal generating means, means connected to said controlled means for generating a modifying signal for said controlled means, and means comprising a thermal delay coupling connected to said controlled means and responsive to one of said first two named signals for developing a third signal to further modify the energization of said controlled means.

15. In combination, signal generating means, controlled means connected to and energized by said signal generating means, means connected to said controlled means for generating a modifying signal for said controlled means, and means comprising a time delay coupling connected to said controlled means and responsive to one of said first two named signals for developing a third signal to further modify the energization of said controlled means.

16. In an automatic steering system for a vehicle having a control surface movable with respect thereto for controlling said vehicle about an axis thereof, a servomotor for operating said surface, reference means on said vehicle for generating a signal in response to a departure of said vehicle from a predetermined position to energize said motor, and a time delay device energized by said signal for modifying operation of said servomotor.

17. The combination with an automatic steering system for a vehicle having a control surface movable with respect thereto for controlling said vehicle about an axis thereof together with a servomotor for operating said surface and means operated by said motor for producing a follow-up signal for modifying the operation of said motor, of a time delay device energized by said follow-up signal for further modifying operation of said motor.

PAUL A. NOXON.

REFERENCES CITED

The following references are of record in the file of this patent:

UNITED STATES PATENTS

| Number | Name | Date |
| --- | --- | --- |
| 2,295,960 | Moore | Sept. 15, 1942 |